United States Patent [19]

Aizawa et al.

[11] Patent Number: 5,034,081
[45] Date of Patent: Jul. 23, 1991

[54] METHOD FOR THE PREPARATION OF AN EMBOSS-WORKED PLASTIC CARD

[75] Inventors: Katsuhisa Aizawa; Osami Hayashi, both of Saitama, Japan

[73] Assignee: Shin-Etsu Polymer Co., Ltd., Tokyo, Japan

[21] Appl. No.: 447,653

[22] Filed: Dec. 8, 1989

[30] Foreign Application Priority Data

Dec. 20, 1988 [JP] Japan .................. 63-321827

[51] Int. Cl.$^5$ ............................................. B32B 31/20
[52] U.S. Cl. ........................ 156/220; 156/219; 156/247; 156/249; 283/108
[58] Field of Search ............... 156/219, 220, 247, 249; 400/127; 101/32; 283/108, 109, 904

[56] References Cited

U.S. PATENT DOCUMENTS

| | | | |
|---|---|---|---|
| 1,640,787 | 8/1927 | Martin et al. ...................... | 101/32 |
| 3,047,443 | 7/1962 | Anderson ........................... | 156/219 X |
| 3,480,500 | 11/1969 | Hotter ................................ | 156/220 |
| 4,506,915 | 3/1985 | Haghiri-Tehrani et al. ... | 283/109 X |
| 4,507,346 | 3/1985 | Maurer et al. .................... | 283/904 X |

Primary Examiner—Michael W. Ball
Assistant Examiner—Michele K. Yoder
Attorney, Agent, or Firm—Wyatt, Gerber, Burke and Badie

[57] ABSTRACT

The invention provides an efficient method for the preparation of a plastic-made computer-operating card having an emboss-worked relief pattern on the surface by adhesively bonding an emboss-worked plastic-made covering sheet to a body of the card. In the inventive method, a sheet for covering is lined with a second sheet on the back surface and the laminate is emboss-worked so that the debris of the second sheet fills up the cavity formed behind the relief pattern in the first sheet followed by peeling off the undeformed portion of the second sheet leaving the debris filling the cavity. Since the cavity behind the emboss-worked relief pattern is filled up with the debris of the second sheet, the emboss-worked covering sheet is safe from the troubles of collapsing or flattening in the subsequent step of adhesive bonding thereof to the body of the card.

3 Claims, 5 Drawing Sheets

FIG. 5a
FIG. 5b
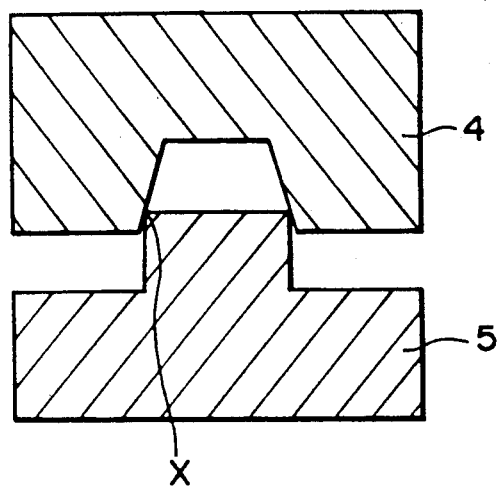
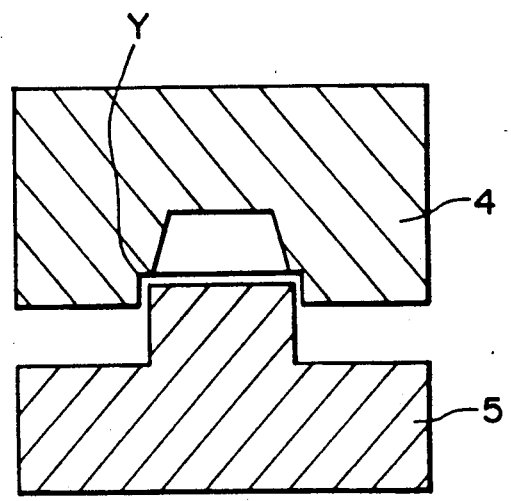

METHOD FOR THE PREPARATION OF AN EMBOSS-WORKED PLASTIC CARD

BACKGROUND OF THE INVENTION

The present invention relates to a method for the preparation of an emboss-worked plastic-made card or, more particularly, to a method for the preparation of an emboss-worked plastic-made card useful as a multi-functional IC card for operation of computers.

An IC card or a multi-functional IC card is constructed from a body of the card having a circuit board mounting a memory IC, liquid-crystal display unit, solar cell, lithium battery and the like built therein and provided with terminals for electric connection with an external electronic instrument and covering sheets bonded to the surfaces of the card body each with an interposed adhesive layer.

The IC card or a multi-functional IC card as compared with conventional computer-operating cards with a magnetic stripe is characteristic in the greatly increased capacity for information memory and is highlighted and expected to be widely employed as data files for office automation or factory automation, clinical charts in hospitals, pocketable personal memory banks, process-control cards and the like, some IC cards being already under practical use in these applications. In particular, multi-functional IC cards can be imparted with compatibility with and are replaceable with conventional existing bankcards for operating cash dispensers and the like when the IC card is provided with a magnetic stripe and an embossed relief pattern indicating letters and symbols as in the conventional computer-operating cards. The embossed relief on a computer-operating card has a dimensions specified in ISO 7810 and JIS X 6301. Namely, the body of an IC card has dimensions of 54.0 mm width, 85.6 mm length and 0.76 mm thickness and the embossed relief pattern formed in a specified area of the card is raised on the surface of the body by a height of 0.48 mm. The patterns of the embossed relief include letters of various characters, numerical figures and symbols, the kinds of which are specified in the above mentioned JIS or other authorized standards.

In these IC cards and multi-functional IC cards, the various electronic components such as printed circuit boards and the like are disposed sometimes over an area extending to the zone allotted to the embossed relief pattern specified in the standard. Therefore, a difficult problem arises in the embossing work that, different from conventional computer-operating plastic-made cards with a magnetic stripe, the embossing work of the card with embossing dies cannot be undertaken after the covering sheets have been bonded to the card body already having such electronic components build therein because of the danger that the electronic components may eventually be destroyed by the pressure under the embossing dies.

Accordingly, a conventional procedure for the preparation of and IC card having an embossed relief pattern on at least one surface is that the covering plastic sheet is emboss-worked beforehand prior to adhesive bonding to the card body. This adhesive bonding method of an embossed covering sheet to the card body is also not and easy matter due to the extremely small thickness of the sheet of 0.05 to 0.10 mm in order that the overall thickness of the IC card after bonding of the covering sheets should not exceed 1 mm or, in particular, 0.76 mm because the embossed relief pattern may be sometimes crushed and flattened by the pressure in the hot press for the adhesive bonding work.

With an object to solve the above mentioned problems, the inventors have previously proposed an improved method in Japanese Patent Kokai No. 63-151496, according to which a plastic sheet for covering of an IC card is provided beforehand with an embossed relief pattern and the recess or cavity formed on the back surface of the sheet is filled with a synthetic resin curable by heating or irradiation with ultraviolet light or electron beams followed by curing of the resin to reinforce the embossed pattern prior to adhesive bonding to the card body. This method is also practically not quite advantageous because the apparatus for the process cannot be compact enough with high costs and the emboss-worked covering sheet may sometimes be subject to deformation in the course of curing of the cavity-filling resin with heating to expose the surface of the sheet outside the resin-filled cavity to the radiant heat.

Alternatively, a method is proposed that flat covering sheets are adhesively bonded to the card body and then a strip of an additional sheet having an embossed relief pattern is bonded to the covering sheet at the specified position on the surface of the card. This method is also not practical because the apparatus cannot be compact and the emboss-worked attachment strip sometimes falls off the covering sheet unless the adhesive bonding strength therebetween is high enough.

SUMMARY OF THE INVENTION

The present invention accordingly has an object to provide a novel and improved method for the preparation of a plastic-made card or, in particular, an IC card having an emboss-worked relief pattern on at least one surface without the above described problems and disadvantages in the prior art methods.

Thus, the method of the present invention for the preparation of a plastic-made card having an emboss-worked relief pattern on at least one surface and composed of a body of the card and a covering sheet having an emboss-worked relief pattern and adhesively bonded to the surface of the body of the card comprises the steps of:

(a) laminating a plastic-made first sheet for the covering sheet and a second sheet of a plastically deformable filling material in a peelable fashion to form a bilayered laminate;

(b) subjecting the laminate to an embossing work to form a relief pattern raised on the surface of the first sheet, the cavity formed on the back surface behind the relief pattern of the first sheet being filled with the plastically deformed second sheet;

(c) peeling the second sheet off the first sheet to leave the debris portion filling the cavity on the back surface fo the first sheet behind the relief pattern; and (d) adhesively bonding the first sheet having the embossed relief pattern with the cavity behind the relief pattern filled with the debris of the second sheet to the body of the card.

BRIEF DESCRIPTION OF THE DRAWING

FIGS. 5a and 5b are each a partial cross section of embossing dies used in the embossing work according to the inventive method.

DETAILED DESCRIPTION OF THE PREFERRED EMBODIMENTS

As is described above, the method of the invention is characteristic in the steps for the preparation of an emboss-worked covering sheet of which the cavity on the back surface behind the relief pattern is filled with a debris of a filling sheet laminated and emboss-worked together with the covering sheet followed by peeling of the filling sheet to leave the debris portion filling the cavity behind the relief pattern. By virtue of the debris portion of the filling sheet to fill up the cavity behind the relief pattern, the covering sheet is fully reinforced in the area of the relief pattern so that the covering sheet can be adhesively bonded to the body of the card without the drawback of collapsing and flattening of the emboss-worked relief pattern under the pressure of a hot press for the adhesive bonding work.

In the following, the method of the present invention is described in detail with reference to the accompanying drawing.

Figure 1A:
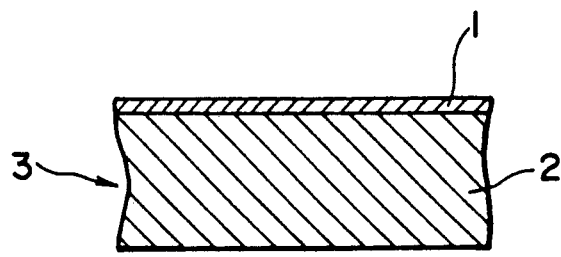
FIGS. 1a to 1d are each a partial cross sectional view of the covering sheet under processing according to the inventive method.

FIGS. 1a to 1d are each given for the illustration of a step of the inventive method by a partial cross section of the covering sheet. In FIG. 1a illustrating the step (a) of the inventive method, a first plastic sheet 1 for the covering sheet is laminated with a second sheet 2 made of a plastically deformable material, which is referred to as the filling sheet to form a bilayered laminate 3. The bonding strength between the sheets 1 and 2 should not be too high or rather should be peelable in the subsequent step (c).

Figure 1B:
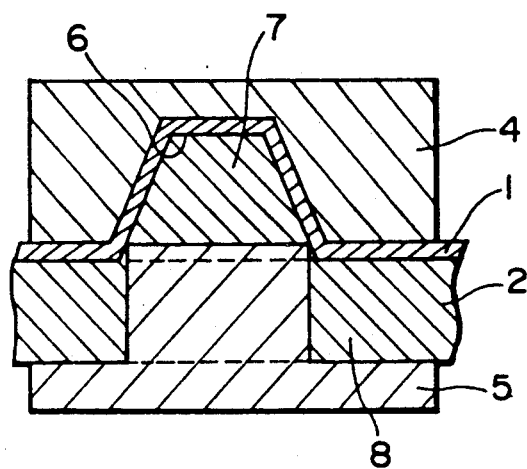
Figure 1B:
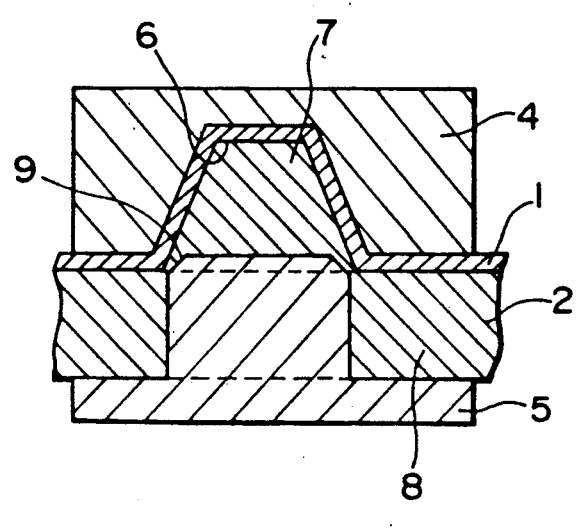

The bilayered laminate 3 prepared in step (a) is then subjected to an embossing work to form a relief pattern raised on the first sheet 1 as is illustrated in FIG. 1b by pressing between a female embossing die 4 and a male embossing die 5 In this embossing work, the filling sheet 2 is punched out at the embossed pattern so that the debris 7 of the filling sheet 2 fills up the cavity 6 formed on the back surface of the sheet 1 behind the relief pattern leaving the remaining portion 8 of the filling sheet 2 undeformed. The filling debris 7 of the filling sheet 2 can be freed from the undeformed portion 8 by complete punching out by the embossing dies 4, 5 but it is optional that the embossing work is controlled not to completely separate the filling debris portion 7 and the undeformed portion 8 of the filling sheet 2 but these portions 7 and 8 are still in a connected condition with a very thin film portion 9 as is illustrated in FIG. 1b'. This film 9 should have a thickness small enough to be readily torn apart in the subsequent step (c) of peeling of the filling sheet 2 without carrying the debris portion 7 filling the cavity 6 of the covering sheet 1.

Figure 1C:
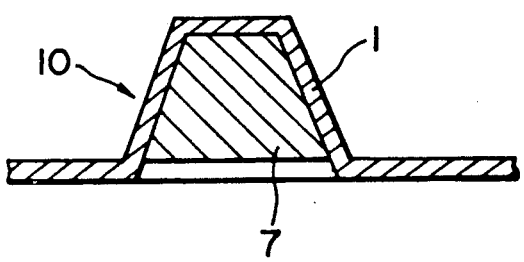
Figure 1D:
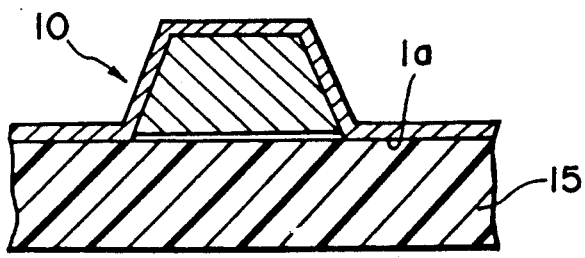
Figure 2:
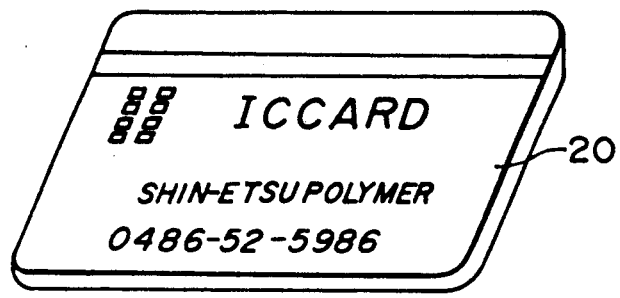
FIG. 2 is a perspective view of an IC card prepared according to the inventive method.

In step (c) of the inventive method, thereafter, the filling sheet 2 or, rather, the undeformed portion 8 alone of the filling sheet 2 is peeled off the covering sheet 1 to leave the debris 7 filling the cavity 6 on the back surface of the covering sheet 1 behind the emboss-worked relief pattern to give an emboss-worked covering sheet 10 illustrated in FIG. 1c by a partial cross section. The thus obtained emboss-worked covering sheet 10 is then adhesively bonded to the body of a card 15 at the back surface 1a to complete the card having an emboss-worked relief pattern on at least one surface as is illustrated in FIG. 1d by a partial cross section. FIG. 2 illustrates a perspective view of the thus prepared card 20.

The plastic material of the covering sheet 1 is not particularly limitative provided that the sheet can be emboss-worked to form a relief pattern. Various known plastic resins conventionally used for the preparation of magnetic-striped computer-operating cards can be used including polyvinyl chloride resins, copolymeric resins of vinyl chloride and vinyl acetate, polycarbonate resins, polyallylate resins, ABS resins, acrylic resins, polyethylene terephthalate resins and the like as well as polymer blends of these resins. The sheet 1 can be a monolayered sheet or a laminate of a plastic sheet with another sheet of a different plastic resin or a natural material such as paper. If desired, the plastic resin for the covering sheet 1 may be blended with a particulate, fibrous or whisker-like filler for reinforcement or laminated with a mesh screen. At any rate, the sheet 1 should have a plastic deformability to be suitable for the embossing work to give a relief pattern having a thickness specified in the industrial standards such as ISO and JIS.

The plastic sheet or film 1 for the embossment should preferably have a thickness in the range from 0.020 to 0.150 mm. When the thickness of the sheet 1 is too large, it would be difficult to prepare a finished IC card having an overall thickness not exceeding the specified value of 0.76 mm after bonding of the covering sheet and the body of the card. When the thickness is too small, the sheet may be subject to breaking in the embossing work or damaged in the course of handling to cause a decrease in the working efficiency with an increase in the overall costs. Several plastic sheets are commerciallized to be particularly suitable for embossing works including a polyvinyl chloride resin sheet having a thickness of 0.100 mm (SP #307, a product by Shin-Etsu Polymer Co.), polycarbonate resin sheet having a thickness of 0.050 mm (Panlite, a product by Teijin Chemical Ltd.), polyallylate resin sheet having a thickness of 0.075 mm (U-Polymer, a product by Unitika Ltd.) and the like. These commercially available resin sheets are suitable for the embossing work on an embossing machine such as Model 7980 manufactured by Dodwell Pitney Bowes Co., Ltd. without the danger of damage by the embossing dies to give a relief pattern of the specified height.

The filling sheet 2, on the other hand, should have a thickness sufficient to fully fill up the cavity 6 formed by the embossing work of the back surface behind the 0.48 mm high relief pattern of the covering sheet 1. When the thickness is too small, the cavity 6 behind the relief pattern cannot be fully filled up by the embossing work of the bilayered laminate 3 so that the emboss-worked relief pattern may still be subject to the danger of collapsing or flattening under the pressure for the adhesive bonding of the covering sheet 1 to the body of the card 15. When the thickness of the filling sheet 2 is too large, on the other hand, the debris portion 7 of the sheet 2 filling the cavity 6 of the relief pattern cannot be in a condition readily separable from the undeformed portion 8 of the sheet 2 in the subsequent step of peeling in addition to the danger that the sheet 1 for covering may eventually be destroyed by the peeling work. In this regard, the filling sheet 2 should have a thickness in the range from 0.1 to 1.0 mm or, preferably, in the range from 0.2 to 0.7 mm.

The material of the filling sheet 2 is also not particularly limitative provided that the material has a sufficient plastic deformability to fill up the cavity 6 behind the relief pattern on the covering sheet 1. Examples of suitable plastically deformable materials include plastic resins such as polyvinyl chloride resins, acrylic resins, epoxy resins, phenolic resins, ABS resins MBS resins and polystyrene resins, glass cloth, paper and metals such as aluminum. The sheet can be a monolayer of one of these material or a laminate of different kinds of these materials. Among the above named materials, epoxy resins are particularly preferable in respect of the good balance between susceptibility to punching out and plastic deformability. The material for the filling sheet 2 can optionally be admixed with various kinds of known additives such as fillers, aging retarders, plasticizers, stabilizers and the like with an object to improve various properties including susceptibility to punching, plasticity, extendability, behavior in compression and thermal behavior. For example, the susceptibility to punching out can be improved by compounding the material with a substantial amount of a filler including inorganic fillers such as graphite powder and talc, fine powders of synthetic resins, glass fibers, carbon fibers and the like so as to impart the material with increased breakability by the embossing dies. Particularly preferable fillers include talc (Talc MS, a product by Shiraishi Calcium Co.), fine powder of a phenolic resin having a particle diameter of 1 to 20 μm (Belpearl, a product by Kanebo Co.) and graphite powder (CSP-E, a product by Nippon Kokuen Kogyo Co.). When the material of the filling sheet 2 such as a synthetic resin is filled with these fillers, the network structure of the resin molecules would be loosened to enhance the slipping movement of the molecular chains as a result of the synergism with the flowability characteristic of the filler particles to increase the susceptibility of the filling sheet 2 to punching out.

In addition to the above mentioned punching characteristic, the filling sheet 2 is required to be heat-resistant to withstand the temperature in the adhesive bonding work of the embossed covering sheet 1 to the body of the IC card and also to have an adequate rigidity so as to prevent the emboss-worked relief pattern from collapsing under the pressure encountered in the adhesive bonding step or in the course of imprinting of the card. In this regard, a particularly preferable sheet material for the filling sheet 2 is a polyvinyl chloride resin sheet having a thickness of 0.3 mm sold under a tradename of SP #450WH (a product by Shin-Etsu Polymer Co.).

The embossing work of the bilayered laminate in the step (b) of the inventive method can be performed not only by using a combination of a female embossing die 4 and a male embossing die 5 illustrated in FIG. 1b but also by the application of the hot stamping method or vacuum forming. Although the conventional method of hot stamping as such is not applicable here because the thickness of the transferred layer under heating is only a few μm not to be suitable for completely filling up the cavity 6 having a depth of several hundreds of μm formed on the back surface of the covering sheet 1 behind the relief pattern, the method is applicable here also by increasing the thickness of the transferred layer and using a machine having a heating means for the engraved metal plate to activate the hot-melt adhesive. In the method of vacuum forming, which is suitable for deep drawing of a plastically deformable sheet, the embossing work of the bilayered laminate 3 can be performed by using a female mold having suction ports at the bottom of the cavity. Each of these two methods has a disadvantage that a relatively large machine having a heating means is to be used in addition to the problem that the sheet is sometimes subject to thermal deformation to cause a decrease in the dimensional accuracy of the embossed relief pattern or collapsing of the pattern by the heat or mechanical pressure encountered in the step of adhesive bonding of the covering sheet 10 to the body of the card 15. Accordingly, these methods are less preferable as compared with the embossing method by using a combination of a female embossing die 4 and a male embossing die 5 in which the laminate 3 is absolutely free from the influences of heat such as thermal deformation or shrinkage of the laminate 3 to ensure high accuracy in the positioning on the body of the card 15.

Figure 3A:
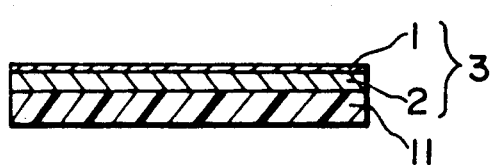
FIGS. 3a and 3b and FIGS. 4a and 4b are each an illustration of a different embodiment of the bilayered laminate used in the inventive method by a partial cross sectional view.
Figure 3B:
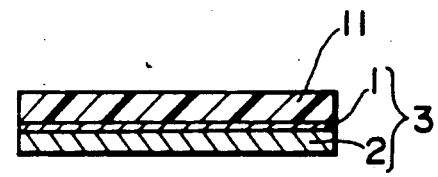

It is optional that the bilayered laminate 3 of the covering sheet 1 and the filling sheet 2 is provided with a lining sheet 11 for reinforcement as is illustrated in FIGS. 3a and 3b on the filling sheet 2 (FIG. 3a) or on the covering sheet 1 (FIG. 3b) with an object to prevent the emboss-worked relief pattern from inadvertent deformation in the course of the embossing work. The lining sheet 11 bonded to or laminated with the filling sheet 2 as is illustrated in FIG. 3a has an effect to ensure reliableness of the embossing work. When an embossed letter or symbol has a closed curve as in the numerical figure of 0(zero), for example, it sometimes happens that the undeformed portion 8 of the filling sheet 2 surrounded by the closed curve is left unremoved from the cavity in the female of the embossing die before the peeling step of the filling sheet 2 after embossing to cause a trouble in the next run of embossing while the lining sheet 11 has an effect to decrease such a trouble.

Figure 4A:
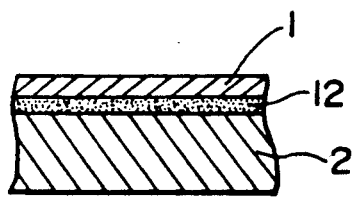
Figure 4B:
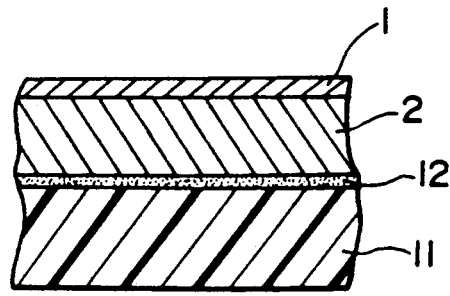

It is further optional that a layer 12 of a pressure-sensitive adhesive is interposed between the covering sheet 1 and the filling sheet 2 or between the lining sheet 11 and the covering sheet 1 or filling sheet 2 as is illustrated in FIGS. 4a and 4b, respectively, in order to ensure exactness of the relative positioning of them and hence exactness of the embossing work so that the emboss-worked relief pattern can fully meet the requirements specified in the standards of the cards such as the ISO or JIS. It is preferable when the adhesive layer 12 is interposed between the covering sheet 1 and the filling sheet 2 as is illustrated in FIG. 4a that the adhesive layer 12 is provided not over the whole surface of the respective sheets but on limited areas, for example, including the embossing zone in order not to unduly disturb the peeling work of the filling sheet 2 from the covering sheet 1 after the embossing work. The adhesive layer 12 interposed between the covering sheet 1 and the filling sheet 2 has an effect to prevent the debris 7 of the filling sheet 2 filling the cavity 6 of the emboss-worked covering sheet 10 illustrated in FIG. 1c from falling.

The embossing work of the laminate 3 is performed by using any of conventional embossing machines so as to form necessary patterns indicating, for example, the name of the possessor of the card, code number and other items of necessary information. It is important that the clearance between the female die 4 and the male die 5 is adjusted taking into account the thickness of the laminate 3 increased by an increment corresponding to the thickness of the filling sheet 2 over the thickness of the covering sheet 1 as such not to give an unduly large stress to the covering sheet 1.

FIGS. 5a and 5b each schematically illustrate a partial cross sectional view of the embossing dies composed of a female 4 and a male 5 used in the embossing work of the inventive method. It is preferable in order that the filling sheet 2 is completely and readily punched out in the embossing work that the male die 5 has a sharp edge X as is illustrated in FIG. 5a although a sharp edge X may be subject to wearing by abrasion when the dies are used repeatedly not to ensure reliableness of the embossing work. Accordingly, it is an alternative way or more preferable way that, as is illustrated in FIG. 5b, that the female die 4 is provided with a step Y along the contour of the female cavity to receive the edge of the male die 5. Since the covering sheet 1 is plastically deformed in compliance with the thus stepped portion Y in the female die 4, an advantage is obtained thereby to decrease the danger that the covering sheet 1 is incised by the sharp edge of the male die 5 even when the clearance between the female die 4 and male die 5 is uncontrollably changed.

Figure 6A:
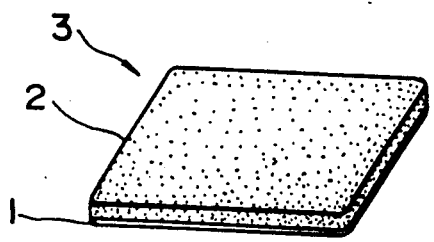
FIGS. 6a to 6d are each a perspective view of a different embodiment of the bilayered laminate used in the inventive method.
Figure 6B:
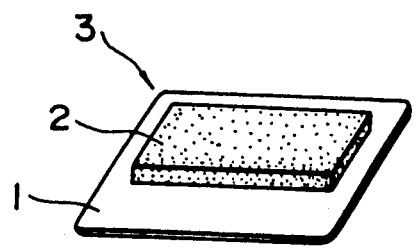
Figure 6C:
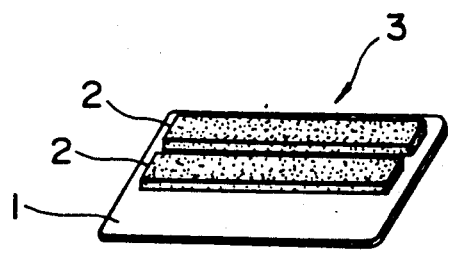

FIGS. 6a to 6c each illustrate a perspective view of a laminate 3 formed of a covering sheet 1 and a filling sheet 2. In the laminate 3 illustrated in FIG. 6a, the covering sheet 1 and the filling sheet 2 have the same planar dimensions to form a complete laminated sheet 3, in which the filling sheet 2 also serves as a reinforcement of the covering sheet 1 to facilitate safe handling thereof. The laminates illustrated in FIGS. 6b and 6c each have the filling sheet 2 laminated only to the embossing zone of the covering sheet 1 so that the cost for the filling sheet 2 can be saved so much as compared with the full laminate 3 illustrated in FIG. 6a though with the sacrifice of the reliableness in the safe handling.

Figure 6D:
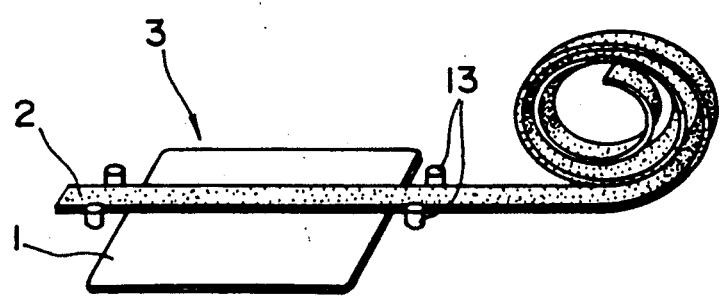

FIG. 6d is given to illustrate an example of the laminating work of the covering sheet 1 and the filling sheet 2 which is supplied in the form of a rolled tape and led on to the correct and exact position on the covering sheet 1 as being guided by the guide pins 13, 13 additionally provided in a conventional embossing machine (not shown in figure), in which the laminating step and the embossing step can be performed successively, so that no adhesive layer 12 illustrated in FIG. 4a need be interposed therebetween not to disturb the peeling work of the filling sheet 2 from the covering sheet 1 after embossing.

The thus emboss-worked covering sheet 10 (FIG. 1c) is then adhesively bonded to the surface of the body 15 of an IC card as is illustrated in FIG. 1d. The adhesive may be applied either to the back surface 1a of the covering sheet 1 or to the upper surface of the card body 15. It is preferable that the back surface 1a of the covering sheet 1 is coated beforehand with an adhesive prior to the embossing work. Alternatively, the bonding work can be performed by sandwiching a double-sided pressure-sensitive adhesive sheet between the emboss-worked covering sheet 10 and the body 15 of the card.

The above described method of the present invention is applicable to the preparation of not only IC cards or multi-functional IC cards but also any of various kinds of cards having an emboss-worked relief pattern on the surface including magnetic cards, optical cards and the like. It is of course that the inventive method is not limited by the overall thickness of the card so that card having a limited small thickness, such as IC cards, and other cards having a non-limitative thickness, such as memory cards, can be prepared equally by the inventive method.

What is claimed is:

1. A method for the preparation of a plastic card having an emboss-worked relief pattern on at least one surface and composed of a body of the card and a covering sheet having an emboss-worked relief pattern and adhesively bonded to the surface of the body of the card which comprises the steps of:
   (a) laminating a plastic first sheet for the covering sheet and a second sheet of a plastically deformable filling material in a peelable fashion to form a bilayered laminate;
   (b) subjecting the laminate to an embossing work to form a relief pattern raised on the surface of the first sheet, the cavity formed on the back surface behind the relief pattern on the first sheet being filled with the plastically deformed second sheet;
   (c) peeling the second sheet off the first sheet to leave the debris portion filling the cavity on the back surface of the first sheet behind the relief pattern; and
   (d) adhesively bonding the first sheet having the embossed relief pattern with the cavity behind the relief pattern filled with the debris of the second sheet to the body of the card at the back surface thereof.

2. The method for the preparation of a plastic card having an emboss-worked relief pattern as claimed in claim 1 wherein the plastic-made first sheet has a thickness in the range from 0.020 to 0.150 mm.

3. The method for the preparation of a plastic card having an emboss-worked relief pattern as claimed in claim 1 wherein the second sheet has a thickness in the range from 0.1 to 1.0 mm.

* * * * *